United States Patent [19]

Lee

[11] Patent Number: 4,636,446

[45] Date of Patent: Jan. 13, 1987

[54] STOPPER STRUCTURE FOR STORAGE BATTERY CONTAINER

[75] Inventor: Yung-Lin Lee, Chia I, Taiwan

[73] Assignee: Cheng Kwang Storage Battery Co., Ltd., Taiwan

[21] Appl. No.: 798,290

[22] Filed: Nov. 15, 1985

[51] Int. Cl.$^4$ .............................................. H01M 2/12
[52] U.S. Cl. ....................................... 429/54; 429/86; 429/87
[58] Field of Search ....................... 429/54, 86, 87, 88, 429/89

[56] References Cited

U.S. PATENT DOCUMENTS

| 2,558,654 | 6/1951 | Kendall et al. | 429/54 |
| 2,571,893 | 10/1951 | Kendall | 429/89 |
| 4,002,495 | 1/1977 | Hakarine | 429/87 |
| 4,052,534 | 10/1977 | Devitt | 429/89 |
| 4,328,290 | 5/1982 | Szymborski et al. | 429/54 |

FOREIGN PATENT DOCUMENTS

| 0972806 | 8/1975 | Canada | 429/87 |
| 1017672 | 10/1957 | Fed. Rep. of Germany | 429/89 |
| 1236545 | 6/1960 | France | 429/89 |

Primary Examiner—Donald L. Walton
Attorney, Agent, or Firm—Bacon & Thomas

[57] ABSTRACT

An improved stopper structure for a storage battery container according to the present invention is basically defined as a unit including a plurality of hollow stopper supports which comprise threaded support, a spongy rubber, and a rubber pad within each hollow stopper support. Each stopper support has a cylindrical shape with a hollow center to accomodate the abovementioned elements, respectively. The gas that evolves during battery operation is blocked by a stopper, additionally, the water vapor has no way to escape, therefore, the amount of battery fluid loss is reduced. At a time that the evolved gas within the hollow stopper support possesses enough pressure, the rubber pad will be forced to curve upwardly. As a result, the gas may be evolved along a slot provided across the bottom surface of a trough carrying the stopper supports.

1 Claim, 5 Drawing Figures

_FIG_3_

STOPPER STRUCTURE FOR STORAGE BATTERY CONTAINER

BACKGROUND OF THE INVENTION

The present invention relates an improved stopper structure for a storage battery centainer, which includes a plurality of stopper supports for plugging into the predetermined openings provided on the container, such that the water vapor is not permitted to escape through the openings, hence, the amount of fluid in storage battery is always kept constant and therefore, the trouble of adding storage battery fluid is avoided.

Referring to FIG. 5, there is shown a perspective view of a prior art device. The stoppers of such prior art device are each of a hollow, cylindrical shaped stopper, which can plug exactly into the openings of the battery container. When in operation, gas will evolve and may escape, with water vapor, through the stopper, therefore, more battery fluid should be added through the openings. Over extended periods of time, if battery fluid is not replenished in such case, the lead plates of storage battery will be sulfurized and damaged, which means that the longevity of the battery will be minimized or more distilled water should be added, and naturally, it is very troublesome. This is due to the pre-determined openings provided on the container and there is no means to block the passage for gas evolved.

SUMMARY OF THE INVENTION

It is a primary object of the present invention to provide an improved stopper structure for a storage battery container which does not permit battery fluid to escape.

It is another primary object of the present invention in addition to the foregoing object, to provide an improved a stopper structure for storage battery container which will alleviate the above disadvantages of prior art and to maintain the battery fluid constant.

It is still another porimary object of the present invention to provide an improved stopper structure for a storage battery container such that the adding of battery fluid can be greatly reduced.

Yet still another primary object of the present invention to provide stopper structure for blocking the escape of water vapour from the storage battery and the release of gas evolved during the operation of the battery.

It is yet still another object of the present invention to provide a stopper structure such that the gas evolved is gathered in stopper supports until sufficient pressure is reached, whereby the gas can escape upwardly through a rubber pad.

In order that the present invention may be more readily understood and put into practical effect, reference will now be made to the accompanying drawings which illustrate a preferred embodiment of the present invention and wherein:

DETAILED DESCRIPTION OF PREFERRED EMBODIMENT

Figure 1:
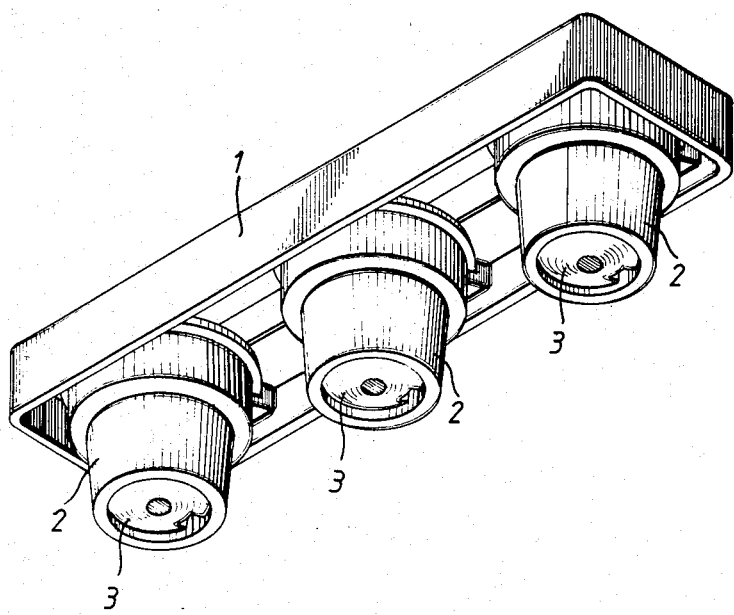
FIG. 1 is a perspective view of an improved stopper for a storage battery container in accordance with the present invention.
Figure 2:
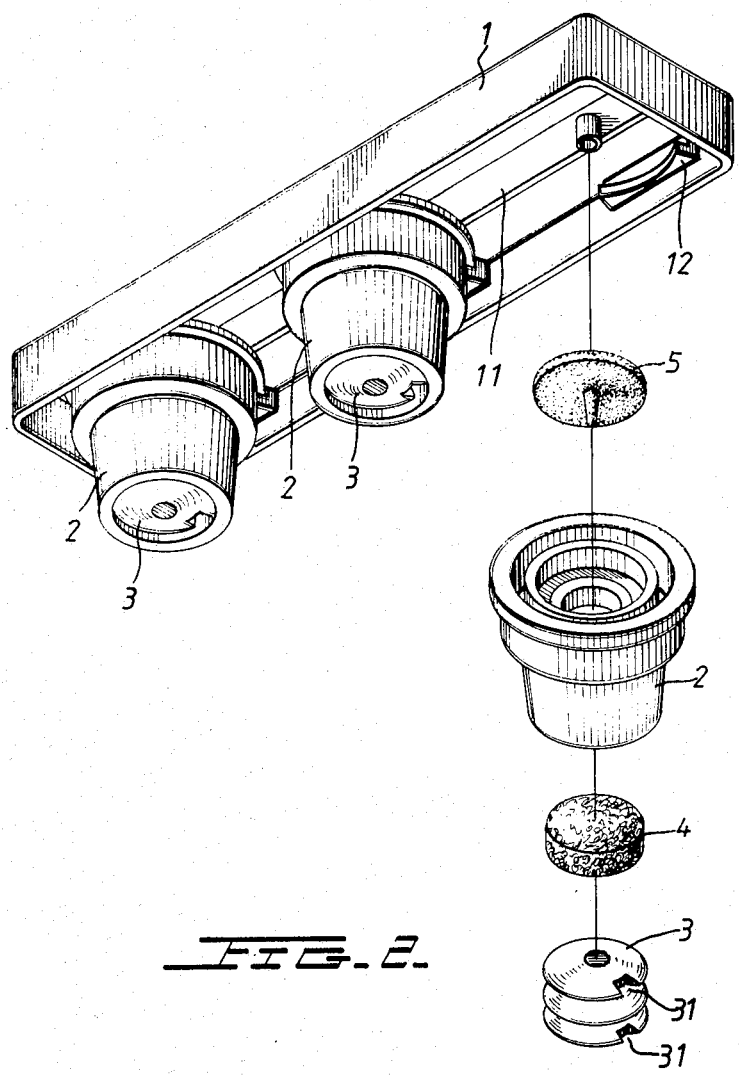
FIG. 2 is an exploded view of an improved stopper structure illustrated in FIG. 1.

An improved stopper for a storage battery according to the present invention includes a plurality of stopper supports (2) as shown in FIG. 2. The stopper is a inverted rectangular shaped trough (1) with a slot (11) transversely provided at the inside of trough. At suitable positions, along the inner face of trough (1), stopper supports holders (12) are mounted in opposed pairs with the edges of each stopper support (2) being engaged in between the pair of stopper support holders (12). Stopper support (2) is a central hollow cylindrical shaped body, within said stopper support (2), a spongy plastic (4) and a spiral shaped body (3) are fitted respectively from therebelow; and a soft rubber pad (5) is inserted from thereabove. There are numerous pores in spongy plastic (4) and hence it can only allow the gas to pass through but not the liquid. At both ends of spiral body (3), a notch (31) is designed such that the gases produce in the storage battery is expelled along the grooves of spiral body (3). The rubber pad (5) is fitted from the top of stopper support (2), if the presure of gas from the storage battery is high enough, the gas will be forced out through the soft rubber pad (5).

Figure 3:
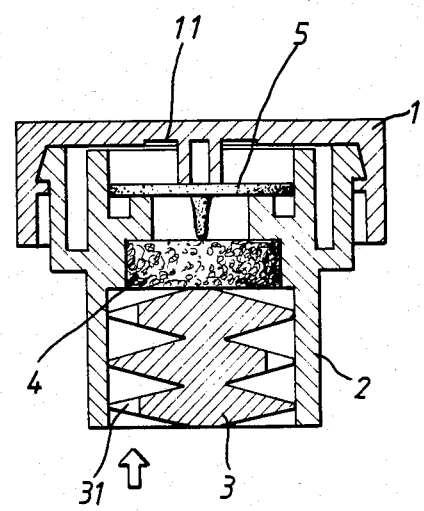
FIG. 3 is a cross-sectional view of an improved stopper structure showing the details of the major components.
Figure 4:
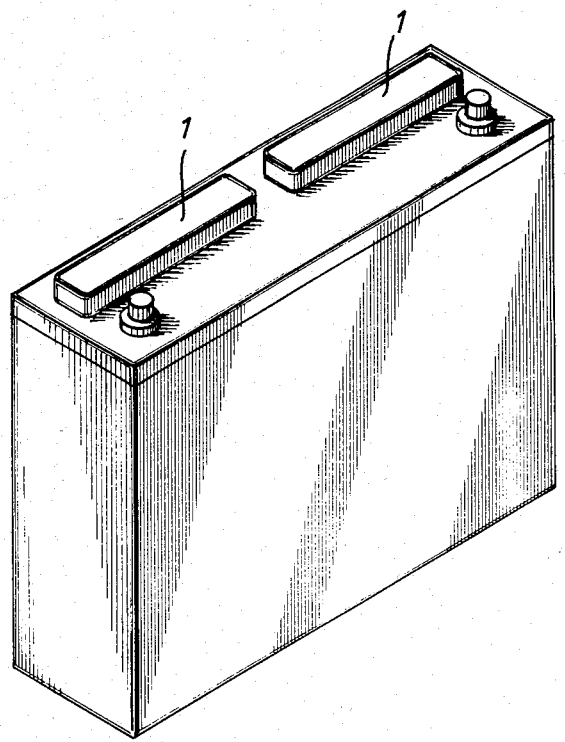
FIG. 4 is a perspective view of an improved stopper structure used in one preferred embodiment.
Figure 5:
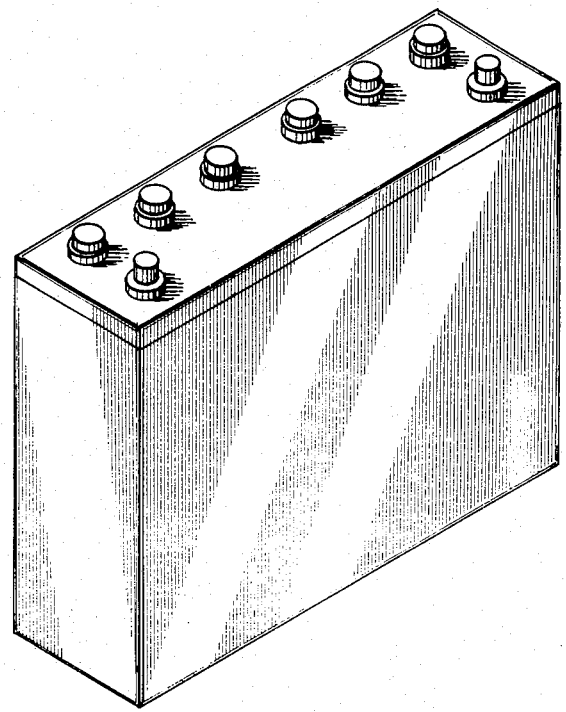
FIG. 5 is a perspective view of a prior art device.

Referring to FIG. 3, The gas from the stopper support (2) passes through notch (31) and groove of the spiral body (3), pored-spongy plastic (4) and force upward the rubber pad (5), which then expel along the slot (11) of trough (2).

Although the invention has herein above been described in the presently preferred practice, it will be understood by those having skill in the art that the invention is capable of modification and variation and is limited only by the following claim.

I claim:

1. An improved stopper for a storage battery containing comprising:
   - (a) a rectangular-shaped open trough provided with an internal longitudinal slot and a plurality of spaced holders;
   - (b) a plurality of stopper structures, each stopper structure being engageable with a spaced holder;
   - (c) each stopper structure being defined by a hollow cylindrical-shaped body having disposed therein:
     - i. a porous plastic body permeable only to gas,
     - ii. a spiral-shaped body provided with notches at both ends for directing gas in a circular direction from the container towards the porous plastic body, and
     - iii. a flexible rubber pad spaced from the porous plastic body and defining a space therebetween, the pad including a protrusion engageable against the porous plastic body for supporting the pad thereon, whereby gas evolved from the battery and trapped within the space causes the periphery of the pad to curve outwardly when the pressure of the gas reaches a given level, thereby causing the gas to vent from the space and along the slot to the exterior of the stopper.

* * * * *